April 27, 1926.
A. H. DON HOWE
1,582,045
VEHICLE
Filed July 12, 1924
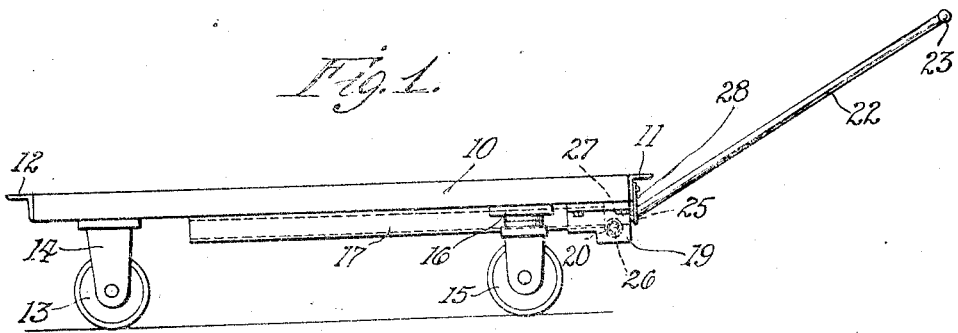
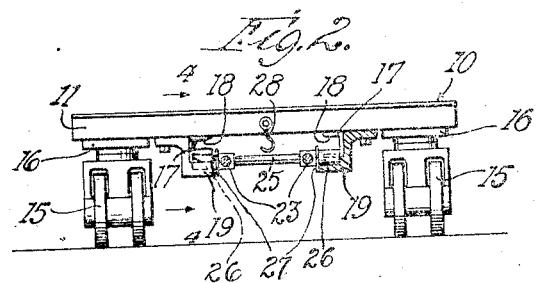 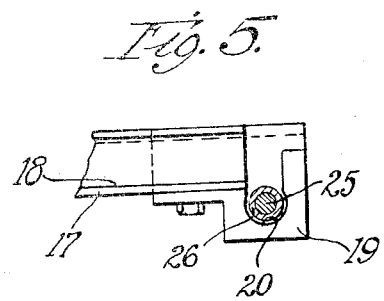
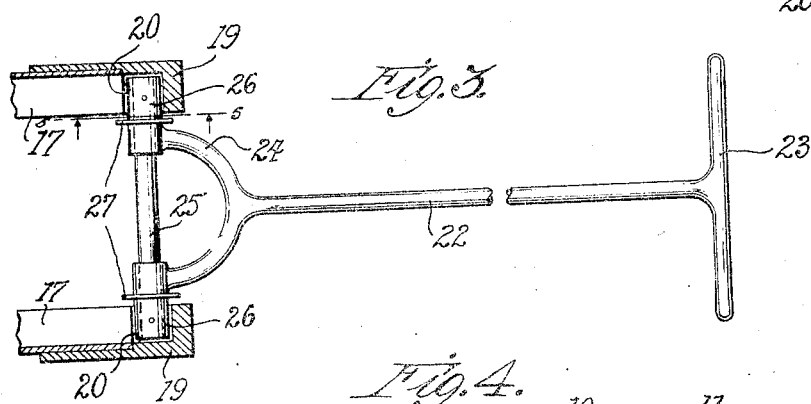
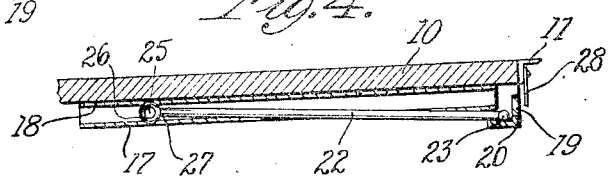
Inventor
Alonzo H. Don Howe Patented Apr. 27, 1926.

1,582,045

UNITED STATES PATENT OFFICE.

ALONZO HJORTH DON HOWE, OF CHICAGO, ILLINOIS, ASSIGNOR TO WESTERN ELECTRIC COMPANY, INCORPORATED, OF NEW YORK, N. Y., A CORPORATION OF NEW YORK.

VEHICLE.

Application filed July 12, 1924. Serial No. 725,611.

*To all whom it may concern:*

Be it known that I, ALONZO HJORTH DON HOWE, a citizen of the United States, residing at Chicago, in the county of Cook and State of Illinois, have invented certain new and useful Improvements in Vehicles, of which the following is a full, clear, concise, and exact description.

This invention relates to vehicles, and more particularly to an improved tongue or steering handle therefor.

The present invention is particularly applicable to hand trucks of the flat type commonly used in manufacturing plants for transporting long or bulky objects which may so materially overlap the boundaries of the truck platform that a handle cannot be used for steering and propelling it. Heretofore, hand trucks of this type have been constructed without handles and several methods were employed for steering and propelling the truck when empty or loaded with small objects. In some instances, a suitable length of rope was attached to the forward end of the truck so that it could be more easily moved from one place to another when empty. This method proved to be unsatisfactory, due to the fact that the trucks swayed from one side to another while being moved and sometimes collided with other trucks, objects or persons close by. Another disadvantage of this method was due to the fact that it was very difficult to move the truck backwards by means of the rope and sometimes also very difficult to steer it from one place to another, especially in a limited space.

The object of this invention is to provide a vehicle with a permanently attached handle which may be adjusted from an operative position to an inoperative position substantially within the boundaries of the vehicle frame.

With this and other objects in view which will become apparent from the following detailed description, one embodiment of the invention may comprise a hand truck of a well known type, comprising a flat platform supported upon a plurality of rollers. A handle may be provided having a cross bar at either end, the rear cross bar being free to ride loosely in the grooves of a pair of channels or guide members fastened lengthwise, and parallel to each other, on the underside of the platform. When the handle is in an inoperative position, the rear cross bar engages the grooves in the parallel channels and the front cross bar engages pockets formed in the forward ends of the channels; and when in an operative position, the rear cross bar engages these pockets. Suitable means is provided for preventing displacement of the handle from the truck.

In the accompanying drawings, which illustrate one specific embodiment of the invention, Fig. 1 is a side elevation of a hand truck with a steering handle embodying this invention mounted thereon;

Fig. 2 is a front elevation, partly in section, of the structure shown in Fig. 1;

Fig. 3 is an enlarged plan view, partly in section, of the steering handle;

Fig. 4 is a fragmentary sectional view taken on the line 4—4 of Fig. 2, and

Fig. 5 is a detail sectional view taken on the line 5—5 of Fig. 3.

Referring now to the drawings in detail, wherein like reference characters designate like parts throughout the several views, 10 denotes a rectangular platform which is preferably reinforced at the front and rear ends by angle iron bumpers 11 and 12, respectively. A pair of rollers 13, journaled in bearings 14, support the rear end of the platform 10; the front end of which is supported by a pair of roller casters 15, pivotally mounted in bearings 16, secured to the underside of the platform. The construction thus far described is well known in the art, and since it forms no part of this invention, it is thought that a further detailed description thereof is unnecessary.

The improvements constituting the subject-matter of this invention will now be described. A pair of channels or guide members 17 are secured lengthwise and parallel to each other to the underside of the platform 10. Hollow castings 19 are secured to the forward ends of the channels 17 to form pockets 20 at the ends of the grooves 18 of the channels. A steering handle 22 is provided with a cross bar 23 at the forward end, and at its rear end it terminates in a yoke 24, to which a cross bar 25 is rigidly secured. Rollers 26 are carried at the ends of the cross bar 25 and are positioned so that they engage the pockets 20 when the handle is in an operative position and ride loosely in the grooves 18 when the handle is being moved to an inoperative position. A pair of annular members 27 secured to the rear cross bar 25 between the channels 17 serve to prevent displacement of the handle from the vehicle frame. A hook 28 is secured to the front end of the platform 10 and serves as a rest or support for the handle when in an operative position.

When it is desired to place and secure the handle in an inoperative position underneath the truck platform, the rear cross bar is lifted out of the pockets 20 and moved along the guide members 17 until the front cross bar engages the pockets 20 formed at the forward ends thereof. The truck may then be used for hauling long objects in which case the steering and propelling is done by manipulating the object itself. It is also advantageous to have the steering handle in this position when the truck is idle or being shipped from one place to another, since it occupies less floor space, there being no projecting handle to interfere with close parking.

If it is desired to use the truck for hauling small objects, in which case a steering handle is very useful, the front cross bar is lifted out of the pockets 20 and the handle is withdrawn until the rear cross bar engages these pockets to provide means for propelling and steering the truck. The annular members 27 insure the handle against displacement or removal from the truck.

Although there is herein illustrated and described one specific embodiment of the invention, it should be understood that the features thereof are applicable to various other vehicles and the details thereof may be varied without departing from the general spirit and scope of the invention which should be limited only by the scope of the appended claims.

What is claimed is:

1. In a vehicle, a platform, a pair of channels secured to said platform, pockets formed in said channels, and a handle having a rear cross bar movable in said channels and designed to engage said pockets when the handle is in an operative position.

2. In a vehicle, a platform, a pair of channels secured to said platform, pockets formed in said channels, a handle, a cross bar secured thereto movable in said channels and designed to engage said pockets when said handle is in an operative position, and a second cross bar secured to said handle and designed to engage said pockets when said handle is in an inoperative position.

3. In a vehicle, a platform, a pair of channels secured lengthwise and parallel to each other underneath said platform, pockets formed at the forward ends of said channels, and a handle having a cross bar at the rear end and movable in said channels, said cross bar being adapted to engage the pockets when the handle is in an operative position.

4. In a vehicle, a platform, a pair of channels secured lengthwise and parallel to each other underneath said platform, pockets formed at the forward ends of said channels, and a handle having a cross bar at the forward end and movable in said channels, said cross bar being adapted to engage the pockets when the handle is in an inoperative position.

5. In a vehicle, a platform, a pair of channels secured lengthwise and parallel to each other underneath said platform, pockets formed at the forward ends of said channels, and a handle having a cross bar at either end and movable in said channels, the rear cross bar engaging the pockets when the handle is in an operative position, and the front cross bar engaging said pockets when the handle is in an inoperative position.

In witness whereof, I hereunto subscribe my name this 30th day of June A. D., 1924.

ALONZO HJORTH DON HOWE.